US012729935B2

(12) United States Patent
Engels

(10) Patent No.: US 12,729,935 B2
(45) Date of Patent: Sep. 8, 2026

(54) VIEWING INSTRUMENT

(71) Applicant: Nedinsco B.V., Venlo (NL)

(72) Inventor: Marie Martinus Johannes Cornelis Engels, Reuver (NL)

(73) Assignee: Nedinsco B.V., Venlo (NL)

( * ) Notice: Subject to any disclaimer, the term of this patent is extended or adjusted under 35 U.S.C. 154(b) by 394 days.

(21) Appl. No.: 16/742,387

(22) Filed: Jan. 14, 2020

(65) Prior Publication Data

US 2020/0225006 A1 Jul. 16, 2020

(30) Foreign Application Priority Data

Jan. 15, 2019 (DE) ......................... 102019100913.8

(51) Int. Cl.

*F41H 5/26* (2006.01)
*G02B 6/06* (2006.01)
*G02B 23/08* (2006.01)

(52) U.S. Cl.

CPC ............... *F41H 5/266* (2013.01); *G02B 6/06* (2013.01); *G02B 23/08* (2013.01)

(58) Field of Classification Search

CPC .......... G02B 6/06; G02B 23/00; G02B 23/08; G02B 23/26; G02B 23/10; G02B 7/02; G02B 7/10; F41H 5/26; F41H 5/266; F41H 5/023; F41H 7/02

USPC ........................ 359/402–406, 379, 383, 823; 385/115–116, 119–121

See application file for complete search history.

(56) References Cited

U.S. PATENT DOCUMENTS 2,529,944 A * 11/1950 Houck .................. G03B 13/02 396/281
3,597,065 A * 8/1971 Radulet .................... G03B 3/10 352/140
2014/0185138 A1* 7/2014 Sklarek ................. G02B 23/08 359/403
2015/0366436 A1* 12/2015 Iuel ...................... A61B 1/0051 600/149

FOREIGN PATENT DOCUMENTS

| | | | |
|---|---|---|---|
| DE | 10253477 | A1 | 4/2004 |
| DE | 10323331 | A1 | 10/2004 |
| DE | 102009030100 | A1 | 1/2011 |
| DE | 102011100494 | A1 | 11/2012 |
| JP | 56-8105 | A | 1/1981 |

* cited by examiner

*Primary Examiner* — Jie Lei

(74) *Attorney, Agent, or Firm* — Adams & Reese LLP; John Henry Scott, III

(57) ABSTRACT

The invention relates to a viewing instrument (1) for observing the surroundings and aiming at targets in the surroundings of a vehicle, in particular an armored vehicle, comprising an eyepiece unit (2) and an objective unit (3) and comprising an optical waveguide bundle (4), which connects the objective unit (3) and the eyepiece unit (2) to each other, a drive device (5), which moves a lens system (6) of the objective unit (3) along the optical axis, specifically between two or more positions, every one of which being assigned to a different field of view setting, wherein the drive device (5) comprises a force transmission means (7) which connects the eyepiece unit (2) to the objective unit (3) and transmits a manual adjustment force from the eyepiece unit (2) to the objective unit (3).

8 Claims, 8 Drawing Sheets

VIEWING INSTRUMENT

The invention relates to a viewing instrument for observing the surroundings and aiming at targets in the surroundings of a vehicle, in particular an armored vehicle, comprising an eyepiece unit and an objective unit and comprising an optical waveguide bundle, which connects the objective unit and the eyepiece unit to each other.

Such a viewing instrument is disclosed by DE 102 53 477 A1. The viewing instrument enables a direct optical view, independent of electrical or electronic auxiliary means, and a positioning of the observer to the viewing instrument almost independent of the location of the objective unit of the viewing instrument. Thereby the user in the protected environment of a vehicle, in particular an armored vehicle, can observe the surroundings through the objective unit via the eyepiece unit. The aperture angle of the objective unit can be kept constant or be set by way of constructive manifestations of the objective unit. A disadvantage of the solution described here is that it is not possible to set the aperture angle of the objective unit from the eyepiece unit.

Viewing instruments for observing the surroundings of a vehicle are disclosed in each case by DE 103 23 331 A1, DE 10 2011 100 494 A1 and JP S56-08105 A, which comprise an eyepiece unit, an objective unit and an optical waveguide bundle.

DE 10 2009 030 100 A1 discloses a viewing instrument for observing the surroundings of a vehicle, which comprises an eyepiece unit and an objective unit, wherein a magnification can be changed by pivoting in additional lenses into the objective unit.

It is therefore an object of the invention to specify an improved viewing instrument which enables a simple way, independent of electrical or electronic auxiliary means, of setting the field of view captured by the objective unit, on the eyepiece unit.

Said object is achieved by a viewing instrument having the features of claim 1.

With a drive device, which moves a lens system of the objective unit along the optical axis, specifically between two or more positions, every one of which being assigned to a different field of view setting, wherein the drive device comprises a force transmission means which connects the eyepiece unit with the objective unit and transmits a manual adjustment force from the eyepiece unit to the objective unit, the field of view captured by the objective unit can be set simply on the eyepiece unit, independent of electrical or electronic auxiliary means. The drive device, with which the lens system of the objective unit can be moved along the optical axis formed in the objective unit, allows the selection of at least two or more positions of the lens system, wherein every selectable position of the lens system provides a different field of view setting. The force transmission means of the drive device provides a simple way of positioning the lens system in the objective unit in the field of view settings, via the manual adjustment, performed by the user, of the viewing instrument on the eyepiece unit. For this purpose, the force transmission means transmits an adjustment force, applied by the user on the eyepiece unit, to the objective unit. On account thereof, enemy targets in the surroundings can be observed and aimed at via the viewing instrument, even in the case of failure of the electrical system of an armored, armed vehicle.

Advantageous embodiments and developments of the invention are evident from the dependent claims. It is to be pointed out that the features specified individually in the claims can also be combined with one another in any desired and technologically expedient manner and thus show further embodiments of the invention.

According to an advantageous embodiment of the invention, the lens system is arranged on an adjustable slide, which is displaceable along the optical axis in the objective unit. With the inclusion of the lens system on an adjustable slide, the lens system can very simply be moved and guided along the optical axis relative to the rest of the objective unit in order to provide the different field of view settings in such a manner.

Particularly preferred is an embodiment, which provides for the adjustable slide to be displaceable back and forth between two positions defined by end stops in the objective unit. The adjustable slide is displaceable in such a manner between the two end stops along the optical axis formed in the objective unit. With the two end stops in the objective unit, two well-defined positions for the lens system are fixed, which provide two different field of view settings. These positions of the lens system, fixed by the end stops, enable field of view settings, which are kept particularly robust against vibrations or accelerations of the objective unit. Thereby it is also possible to couple the objective unit with a weapon system, wherein vibrations or accelerations during shooting can be transmitted to the objective unit, without impairing the viewing instrument.

A particularly advantageous embodiment of the invention refers to the force transmission means being a Bowden cable, which transmits the adjustment force as a tensile force. With a Bowden cable the field of view can be set very simply at the eyepiece unit by an adjustment force transmitted as a tensile force, reliably and without electrical or electronic auxiliary means. For this purpose, the Bowden cable transmits the manual adjustment force exerted by the user from the eyepiece unit to the objective unit. The Bowden cable can be flexibly laid from the objective unit to the eyepiece unit, preferably parallel to the optical waveguide bundle.

A particularly advantageous embodiment of the invention provides for the Bowden cable to be designed as a double Bowden cable. The different field of view settings of the objective unit can be performed quickly and simply at the eyepiece unit via a double Bowden cable. The double Bowden cable transmits the manual adjustment force from the eyepiece unit to the objective unit safely and independently of the relative position between the eyepiece unit and the objective unit, wherein, in two opposite adjustment directions, the adjustment force is transmitted redundantly as tensile force. In this way the mechanism functions particularly reliably.

An advantageous embodiment of the invention provides for the drive device to comprise a gear connected to the Bowden cable, wherein the gear converts the transmitted tensile force into a movement of the lens system. With such a gear a robust and reliable adjustment of the lens system in the objective unit is possible, in order to select the different field of view settings of the objective unit at the eyepiece unit. For this purpose the gear converts the tensile force transmitted via the Bowden cable into a defined movement of the lens system along the optical axis, relative to the rest of the objective unit.

Particularly advantageous is an embodiment which provides for the gear to comprise a gear wheel, which is connected to a pulley of the Bowden cable, and a gear rack formed on the adjustable slide, wherein the actuation of the Bowden cable sets the gear wheel into rotation and effects a movement of the adjustable slide via the engagement of the gear wheel and gear rack. The connection of the pulley and the gear wheel makes it possible to simply convert the tensile force transmitted via the Bowden cable into a movement of the adjustable slide. For this purpose the gear wheel engages in the gear rack of the adjustable slide, whereby the rotation of the gear wheel is directly converted into a translation movement of the adjustable slide along the optical axis.

An advantageous embodiment provides for the gear to comprise a spring mechanism, whose spring force holds the adjustable slide at the end stops. With the spring mechanism, an arrangement which is stable against vibrations or accelerations of the objective unit can be realized. It is in particular excluded that the objective unit unintentionally changes the field of view setting due to the vibrations during the firing of a gun.

According to a preferred embodiment of the invention, the spring mechanism is designed so that the spring force on each of the end stops is larger than a maximum accelerating force acting on the objective unit. For the purpose of fixing the required spring force the accelerating force, which for example during firing of the gun acts on the objective unit, should be determined and the spring mechanism should be designed accordingly.

Particularly advantageous is an embodiment which provides for the spring mechanism to comprise a tension spring, which is attached at one end to a fixed point and is attached eccentrically at its other end to the gear wheel. By way of a tension spring, which exerts a spring force on the gear wheel, the adjustable slide can be held particularly simply and reliably at the end stops by the gear. For this purpose the tension spring is connected at one end to the rest of the objective unit via a fixed point and at its other end is attached eccentrically to the gear wheel.

A particularly advantageous embodiment of the invention provides for the gear wheel to be rotatable between two rotational positions assigned to the two end stops, in a manner against the spring force of the spring mechanism, with a dead point located between the two rotational positions. With the rotational movement of the gear wheel across the dead point generated by the spring mechanism, the adjustable slide can simply and quickly take the fixed positions formed at the end stops and the lens system can be fixed on account thereof for the assigned field of view setting. Thereby, a stable arrangement of the adjustable slide in the objective unit against vibrations or accelerations of the objective unit can be realized via the rotation of the gear wheel. A single tension spring holds the adjustable slide at both end stops, depending on the field of view setting, wherein the direction of the holding force exerted on the adjustable slide by the spring changes with the movement across the dead point in each case. Thus the spring supports the operation of the viewing instrument when switching between the field of view settings.

Further features, details and advantages of the invention emerge from the following description and on the basis of the drawings, which show exemplary embodiments of the invention. Mutually corresponding items or elements are provided with the same reference signs in all of the figures. In the figures.

Figure 1:
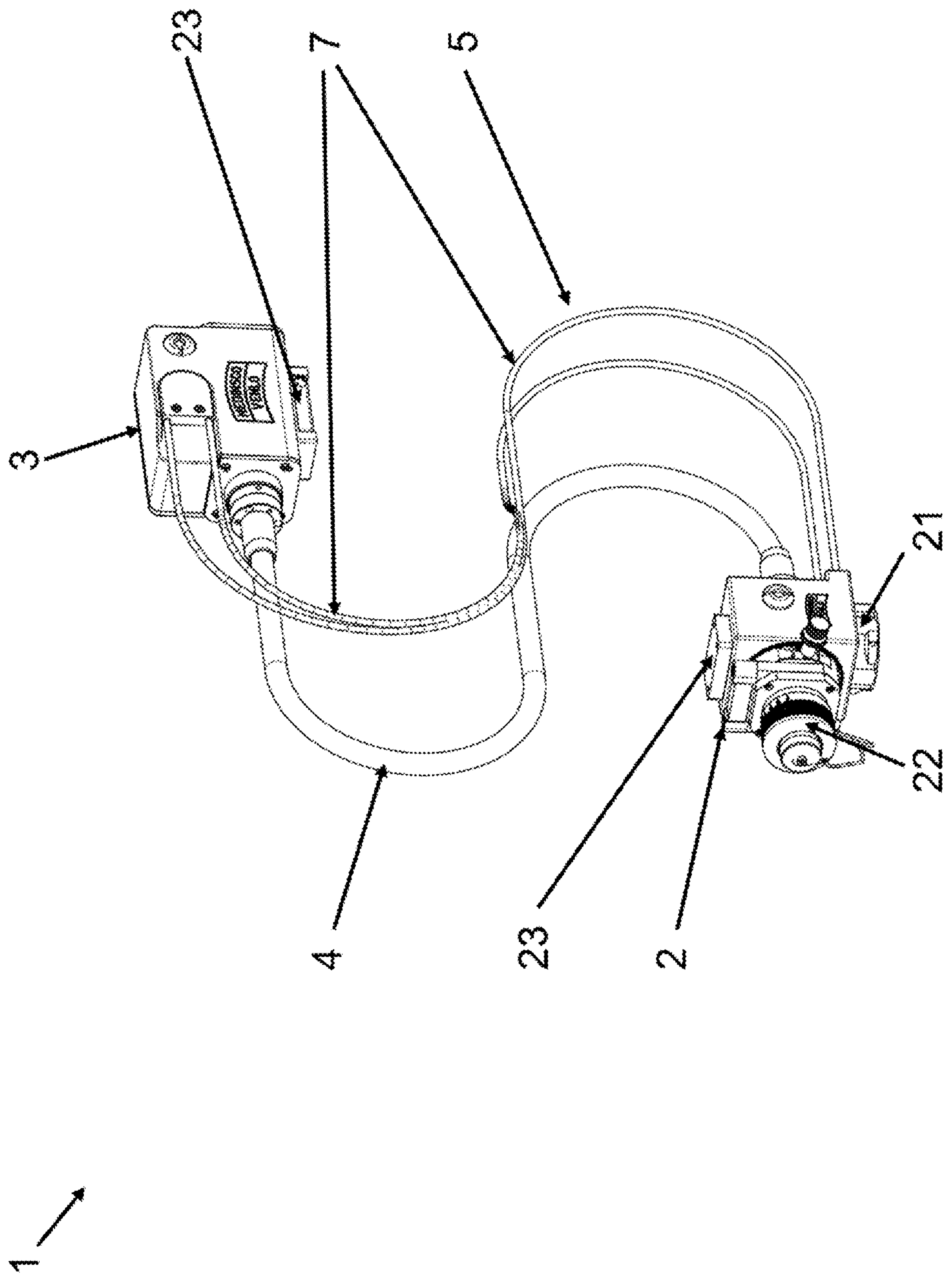
FIG. 1 shows a viewing instrument according to the invention.

In FIG. 1, a viewing instrument according to the invention is illustrated, indicated by reference sign 1. The viewing instrument 1 serves the observation of the surroundings and the aiming at targets in the surroundings of a vehicle (not illustrated), in particular an armored vehicle. For this purpose the viewing instrument 1 has an eyepiece unit 2 and an objective unit 3. While the eyepiece unit 2 can be arranged in the protected environment of a vehicle, in particular an armored vehicle, such that the user of the viewing instrument 1 can thereby observe the surroundings around the armored vehicle from this protected environment, the objective unit 3 is arranged at an outer side of the vehicle, preferably coupled with a weapon system of the vehicle, in order to capture the surroundings and if necessary also to aim at a target. The eyepiece unit 2 and the objective unit 3 are connected by a flexible optical waveguide bundle 4, which transmits the field of view, captured by the objective unit 3, to the eyepiece unit 2. In addition the viewing instrument 1 has a drive device 5, with which a lens system 6 (FIG. 8) of the objective unit 3 can be moved along an optical axis 20 (FIG. 2) formed by the objective unit 3. Thus the lens system 6 (FIG. 8) can be moved between two or more positions along the optical axis 20, wherein every one of the possible positions provides a different field of view setting. The drive device 5 comprises a flexible force transmission means 7, which connects the eyepiece unit 2 to the objective unit 3. Via this connection, a manual adjustment force, which the user exerts on the eyepiece unit 2, can be transmitted to the objective unit 3. In this way the field of view setting of the lens system 6 (FIG. 8) in the objective unit 3 can be changed by the manual adjustment force. For this purpose the force transmission means 7 is designed as a Bowden cable 7, which transmits the adjustment force as a tensile force. As is evident in FIG. 1, the Bowden cable 7 can preferably be designed as a double Bowden cable 7.

Figure 2:
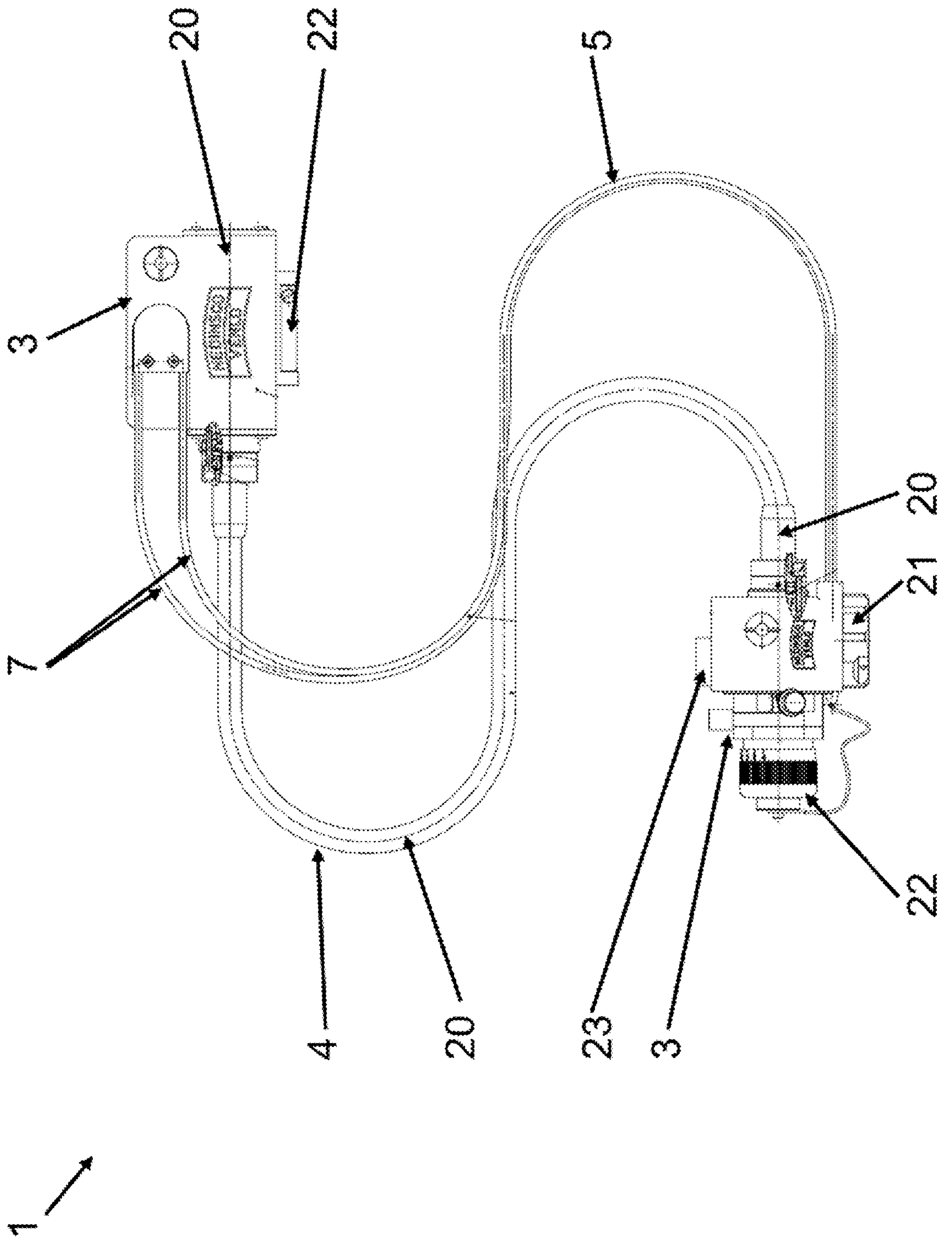
FIG. 2 shows a side view of the viewing instrument.

FIG. 2 shows a side view of the viewing instrument 1 according to FIG. 1. In this illustration the optical axis 20 formed in the objective unit 3 is indicated, which optical axis continues in the optical waveguide bundle 4 and also passes through the eyepiece unit 2. The flexible embodiment of the Bowden cable 7 and optical waveguide bundle 4 enables a flexible arrangement of the eyepiece unit 2 and the objective unit 3, which can be adjusted relative to one another.

Figure 3:
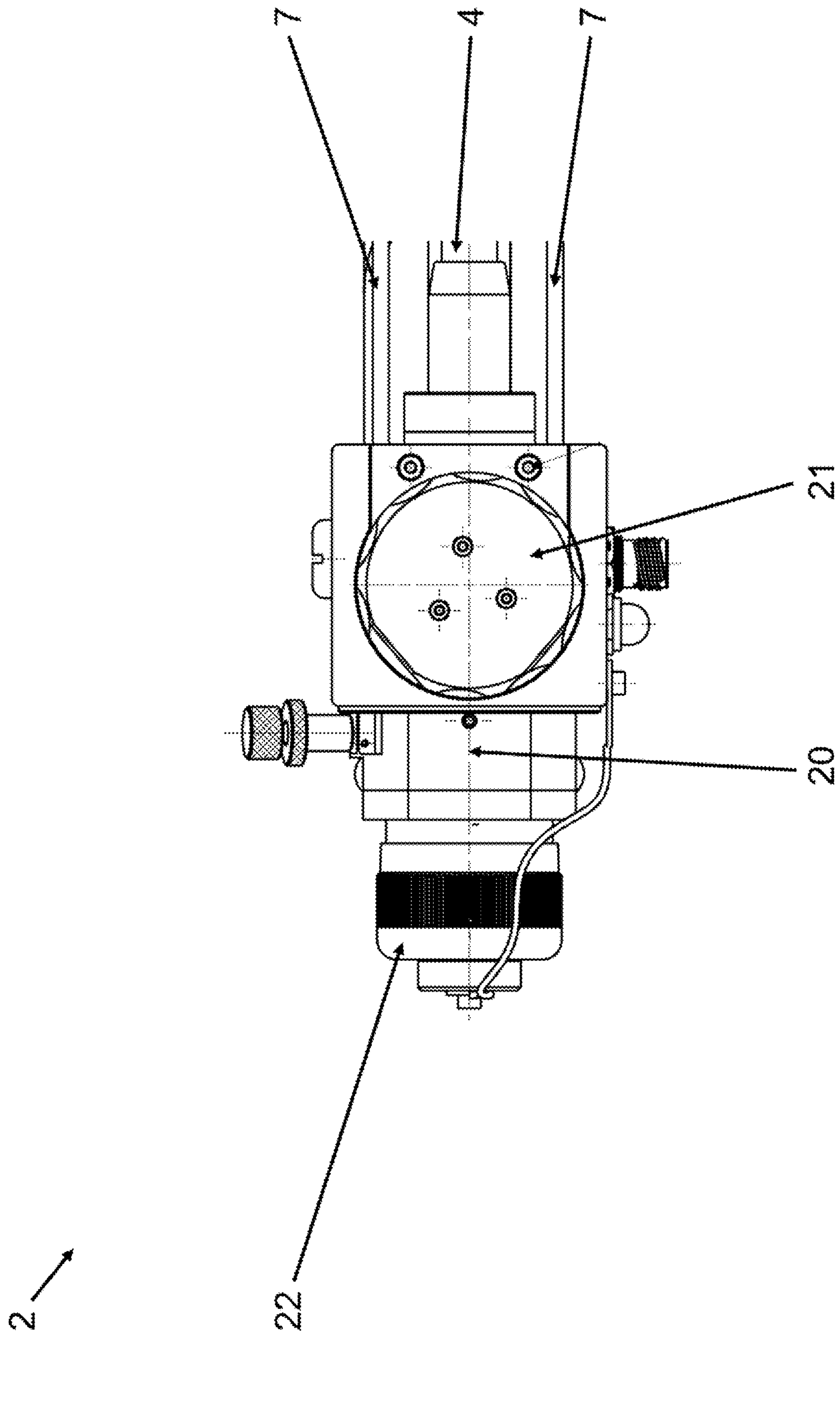
FIG. 3 shows an eyepiece unit.

FIG. 3 discloses a view of the eyepiece unit 2. In this illustration the adjusting wheel 21 arranged on the eyepiece unit 2 is particularly evident, via which adjusting wheel the user can exert a manual adjustment force in order to move the lens system 6 (FIG. 8) in the objective unit 3 along the optical axis 20 and to select different field of view settings. For this purpose the adjusting wheel 21 is coupled with the force transmission means 7 and transmits the manual rotation of the adjusting wheel 21 to the objective unit 3 as a tensile force. The eyepiece unit 2 moreover has a dioptric setting 25, with which a setting of the optical power, dependent on the user, can be performed on the viewing instrument 1. In addition it is evident that the eyepiece unit 2 has a removable protective cap 22, by which the lenses of the eyepiece unit 2 are protected. A further function of the protective cap 22 is to prevent light from the inside being visible outside, externally to the vehicle. This means that the protective cap 22 is only then removed from the dioptric setting 25, when the viewing instrument 1 is used. For this purpose, the protective cap 22 can easily be positioned on and removed from the dioptric setting 25.

Figure 4:
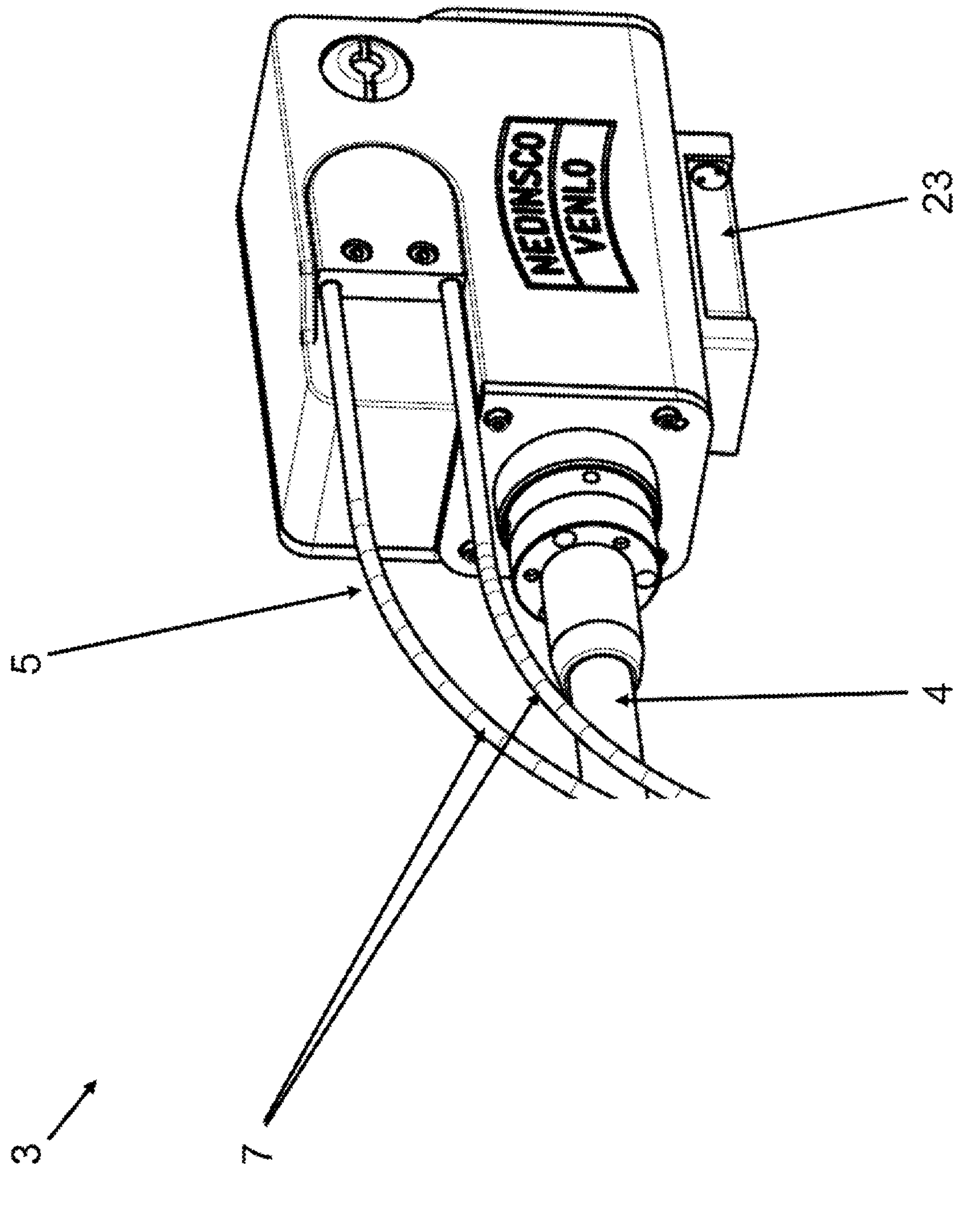
FIGS. 4 and 5 show side views of the objective unit.

FIG. 4 shows a detailed view of the objective unit 3 of the viewing instrument 1 according to FIGS. 1 and 2. In this illustration it is evident that the manual adjustment force is introduced laterally into the objective unit 3 via the force transmission means 7. In this detailed view the mount 23 arranged on the objective unit 3 is additionally particularly evident, with which the objective unit 3 on an outer side of the vehicle can be coupled, in particular with a weapon system.

Figure 5:
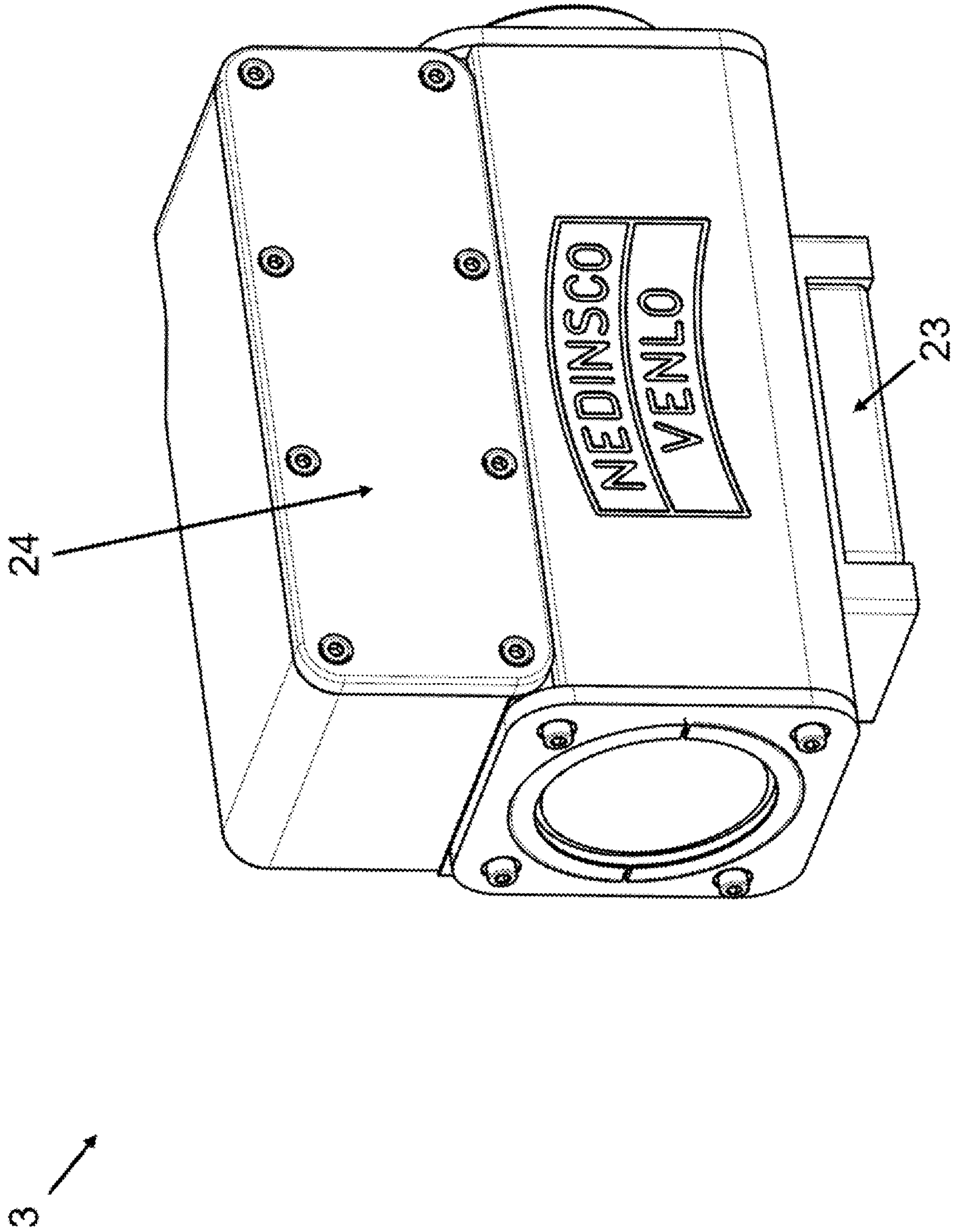

In FIG. 5 a detailed view of the objective unit 3 is shown, from the opposite side to FIG. 4. On this side of the objective unit 3 a covering 24 is evident, with which the housing of the objective unit 3 is closed off.

Figure 6:
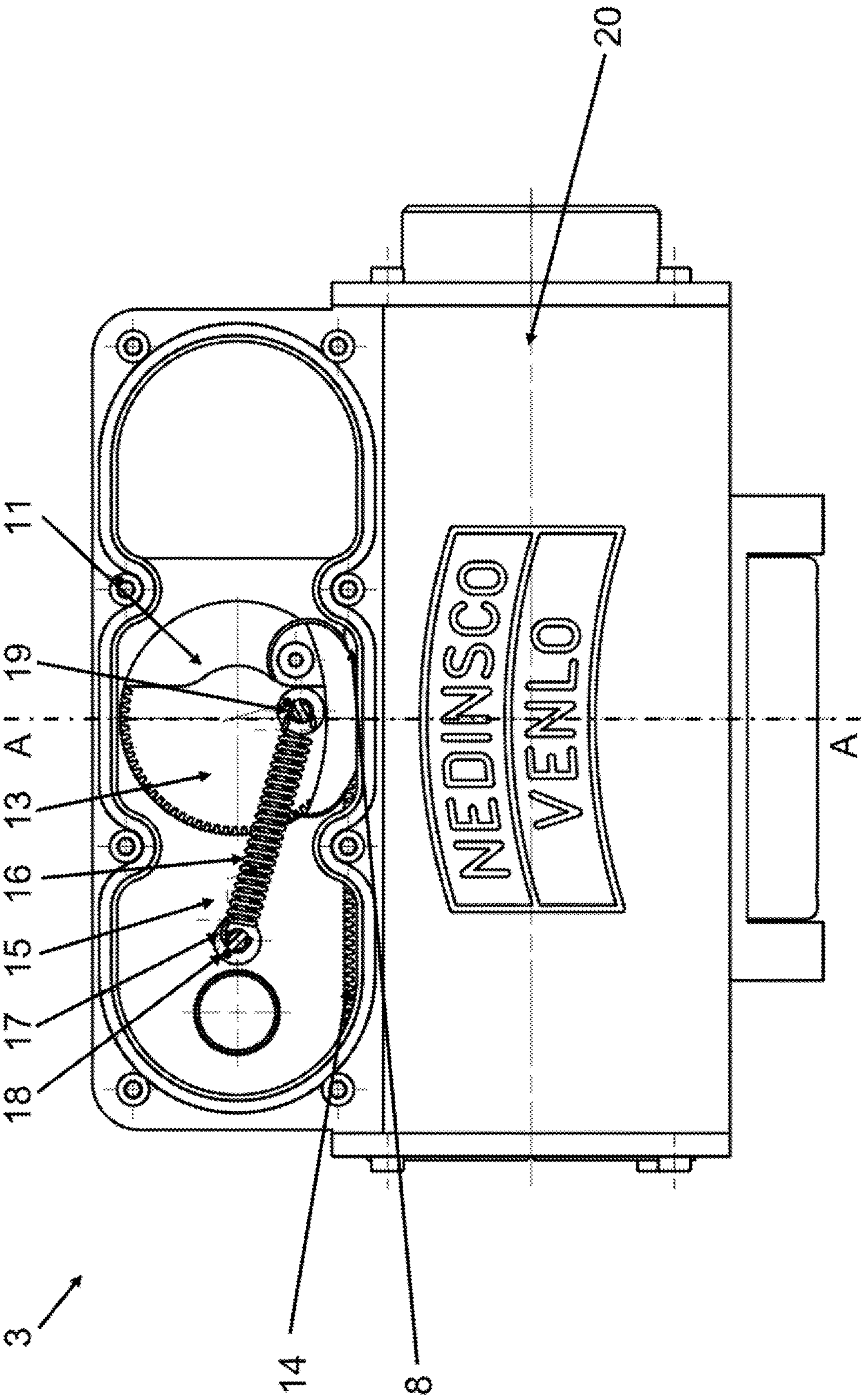
FIG. 6 shows the open objective unit.

FIG. 6 shows a side view of the objective unit 3 according to FIG. 5, wherein here the covering 24 is removed and the housing of the objective unit 3 is thus illustrated as open. In this illustration a gear 11, connected to the Bowden cable 7, of the drive device 5 is evident. This gear 11 converts the tensile force transmitted by the Bowden cable 7 into a movement of the lens system 6 (FIG. 8). For this purpose the gear 11 has a gear wheel 13, connected to a pulley 12 (FIG. 7) of the Bowden cable 7. This gear wheel 13 engages with a gear rack 14, which is formed on an adjustable slide 8. In such a manner the actuation of the Bowden cable 7 effects a rotation of the gear wheel 13, which, by way of the gear 11, is converted by the engagement of the gear wheel 13 and the gear rack 14 into a translation movement of the adjustable slide 8. Thus the adjustable slide 8 with the lens system 6 (FIG. 8) can be displaced along the optical axis 20 in the objective unit 3. Further it is evident that the gear 11 comprises a spring mechanism 15, which is formed by a tension spring 16. The spring mechanism 15 is designed in such a manner that its spring force holds the adjustable slide 8 at two end stops 9, 10 (FIG. 8). With one end 17, the tension spring 16 is connected to the housing of the objective unit 3 at a fixed point 18, wherein the other end of the tension spring 16 is attached eccentrically to the gear wheel 13. Thus a simple hold of the adjustable slide 8 is possible through the spring force of the tension spring 16.

Figure 7:
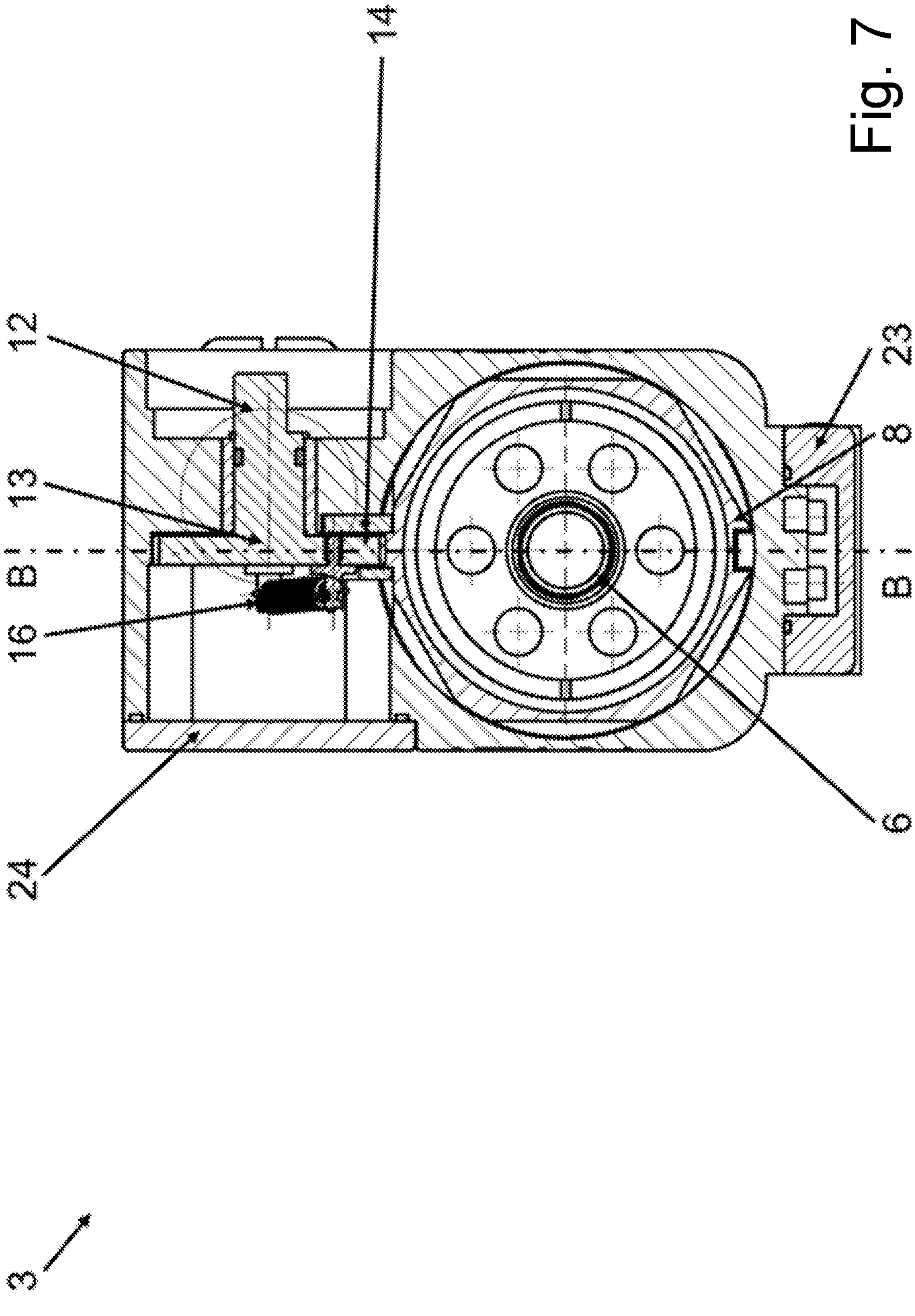
FIG. 7 shows a sectional view through the objective unit.
Figure 8:
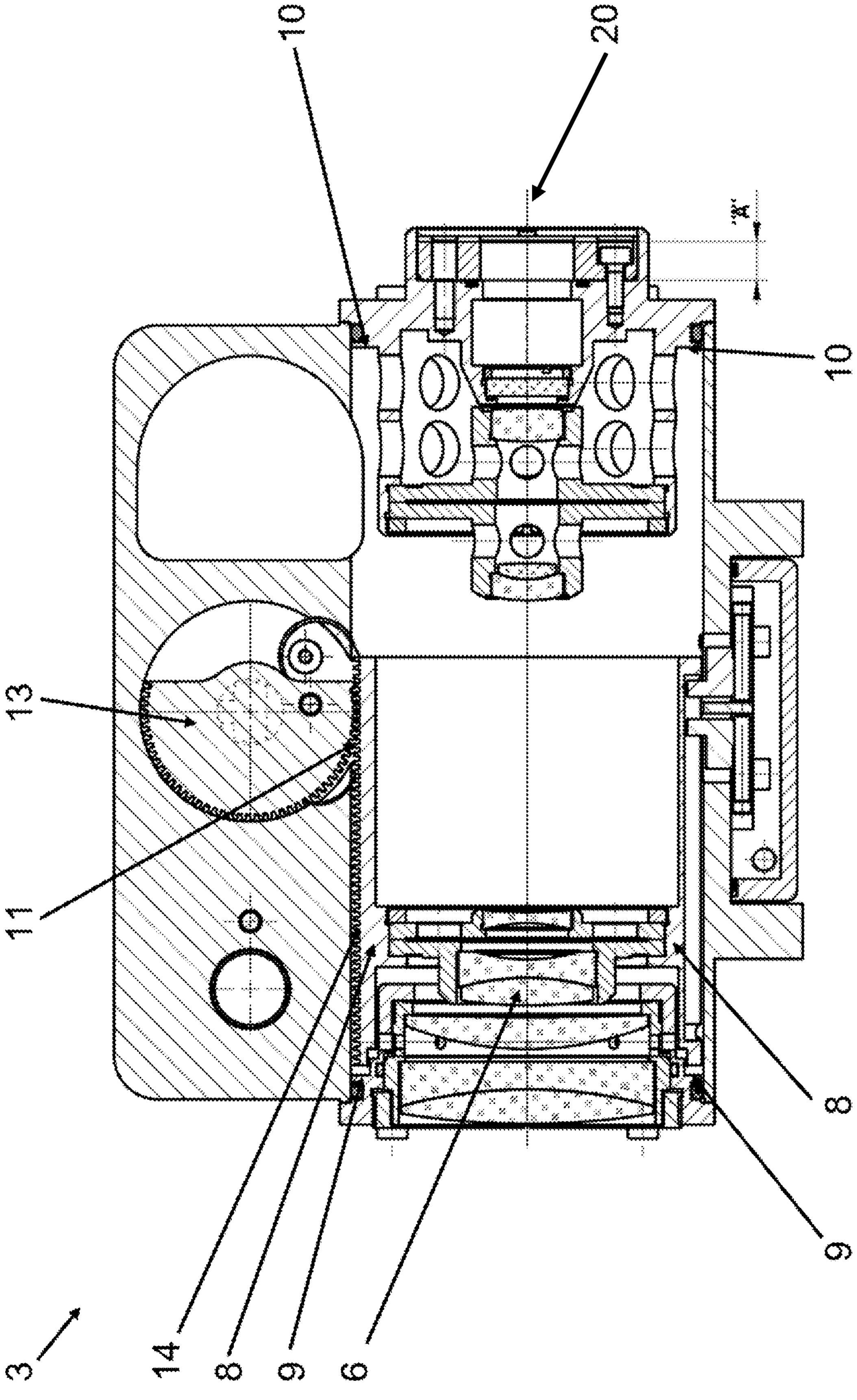
FIG. 8 shows a further sectional view through the objective unit.

FIG. 7 discloses a sectional view according to the section plane A-A marked in FIG. 6. This sectional illustration shows the connection of the pulley 12 of the Bowden cable 7 to the gear wheel 13 of the gear 11. In addition, the engagement of the gear wheel 13 in the gear rack 14 formed on the adjustable slide 8 is evident.

In FIG. 8 a sectional view is shown, according to the section plane B-B marked in FIG. 7. Here the two end stops 9, 10 are evident, on which the adjustable slide 8 is held by the spring mechanism 15. The spring mechanism 15 is designed in such a manner that the spring force exerted by the tension spring 16 on each of the end stops 9, 10 is larger than a maximum accelerating force acting on the objective unit 3, which can result for example through the shooting of weapon system coupled with the objective unit 3. The gear wheel 13 is rotatable against the spring force of the spring mechanism 15 between the two rotational positions assigned to the end stops 9, 10, wherein a dead point is located between both rotational positions. Thus the adjustable slide 8 with the lens system 6 is brought via the spring force into respectively one of the two positions fixed by the end stops 9, 10 are held here. Thus a fast switching of the field of view settings is possible via the manual adjustable force on the eyepiece unit 2.

LIST OF REFERENCE SIGNS

1 Viewing instrument
2 Eyepiece unit
3 Objective unit
4 Optical waveguide bundle
5 Drive device
6 Lens system
7 Force transmission means
8 Adjustable slide
9 End stops v
10 End stops h
11 Gear
12 Pulley
13 Gear wheel
14 Gear rack
15 Spring mechanism
16 Tension spring
17 Tension spring end f
18 Fixed point
19 Tension spring end z
20 Optical axis
21 Adjusting wheel
22 Protective cap
23 Mount
24 Covering
25 Dioptric setting

The invention claimed is:

1. Viewing instrument for observing the surroundings and aiming at targets in the surroundings of a vehicle, in particular an armored vehicle, comprising an eyepiece unit and an objective unit and comprising an optical waveguide bundle, which connects the objective unit and the eyepiece unit to each other, further comprising a drive device, which moves a lens system of the objective unit along an optical axis, specifically between two or more positions, every one of which being assigned to a different field of view setting, wherein the drive device comprises a flexible force transmission means which connects the eyepiece unit to the objective unit and transmits a manual adjustment force from the eyepiece unit to the objective unit, wherein the force transmission means is a Bowden cable which transmits the adjustment force as a tensile force, the drive device comprises a gear connected to the Bowden cable wherein the gear converts the transmitted tensile force, and wherein the gear comprises a gear wheel which is connected to a pulley of the Bowden cable, and a gear rack formed on an adjustable slide wherein the actuation of the Bowden cable sets the gear wheel in rotation and effects a movement of the adjustable slide via the engagement of the gear wheel and gear rack.

2. Viewing instrument according to claim 1, wherein the lens system is arranged on an adjustable slide, which is displaceable along the optical axis in the objective unit.

3. Viewing instrument according to claim 2, wherein the adjustable slide is displaceable back and forth between two positions defined by end stops in the objective unit.

4. Viewing instrument according to claim 1, wherein the Bowden cable is designed to double as a Bowden cable.

5. Viewing instrument according to claim 1, wherein the gear comprises a spring mechanism, whose spring force holds the adjustable slide at the end stops.

6. Viewing instrument according to claim 5, wherein the spring mechanism is designed so that the spring force on each of the end stops is larger than a maximum accelerating force acting on the objective unit.

7. Viewing instrument according to claim 5, wherein the gear wheel is rotatable between two rotational positions assigned by the two end stops, in a manner against the spring force of the spring mechanism, with a dead point located between the two rotational positions.

8. Viewing instrument according to claim 1, wherein the spring mechanism comprises a tension spring, which is attached at one end to a fixed point and is attached eccentrically at its other end to the gear wheel.

* * * * *